July 10, 1962  C. H. WILL, JR  3,043,147
GYROSCOPIC DEVICE AND METHOD OF ASSEMBLY
Filed Dec. 9, 1957  2 Sheets-Sheet 1

INVENTOR.
CHRISTIAN H. WILL, JR.
BY
ATTORNEY

July 10, 1962  C. H. WILL, JR  3,043,147
GYROSCOPIC DEVICE AND METHOD OF ASSEMBLY
Filed Dec. 9, 1957  2 Sheets-Sheet 2

INVENTOR.
CHRISTIAN H. WILL, JR.
BY
ATTORNEY

United States Patent Office 3,043,147
Patented July 10, 1962

3,043,147
GYROSCOPIC DEVICE AND METHOD OF ASSEMBLY
Christian H. Will, Jr., Grand Rapids, Mich., assignor to Lear, Incorporated
Filed Dec. 9, 1957, Ser. No. 701,614
3 Claims. (Cl. 74—5)

The present invention relates to the process of assembling a gyroscopic device having a stator completely inclosed within a rotor; and to a gyroscopic device constructed by this process.

In order to obtain extreme accuracy in the operation of a gyroscopic device, it is necessary to have the rotor mounted on the stator in such manner that the bearings are prestressed and that there is no slop or play in the parts. Generally, an attempt is made to have any play in the bearings or between the rotor and stator limited to a maximum of one ten-thousandths (.0001") of an inch. In order to obtain this high degree of accuracy, it is necessary to measure and assemble each gyroscopic device independent of others since the high degree of accuracy is beyond the scope of accumulated tolerances of the individual parts.

Prior to this invention, screw and/or bolt assemblies were used to hold the end bells together. However, in the final adjustment the desired accuracy was not obtained because of the relieving of the threads of the screws and/or bolts. The problem of assembling gyroscopic devices and maintaining this high degree of accuracy is paramount when the rotor completely incloses the bearings and the stator.

In view of the foregoing, it is apparent that the main object of the present invention is to overcome the problems heretofore encountered, and others.

Another object of the present invention is to provide a method of assembling a gyro mechanism.

A further object of the present invention is to provide a gyroscopic mechanism constructed in accordance with the process herein described.

Other objects and a fuller understanding of the invention will become apparent from the following description of a preferred embodiment of the invention when taken in conjunction with the attached drawing in which.

Figure 2:
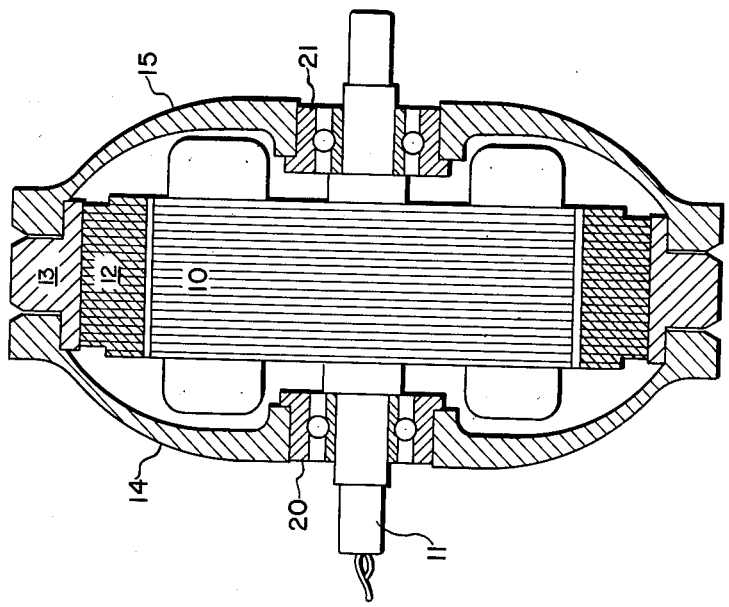
FIG. 2 illustrates the completed gyroscopic mechanism constructed in accordance with the present process.
Figure 1:
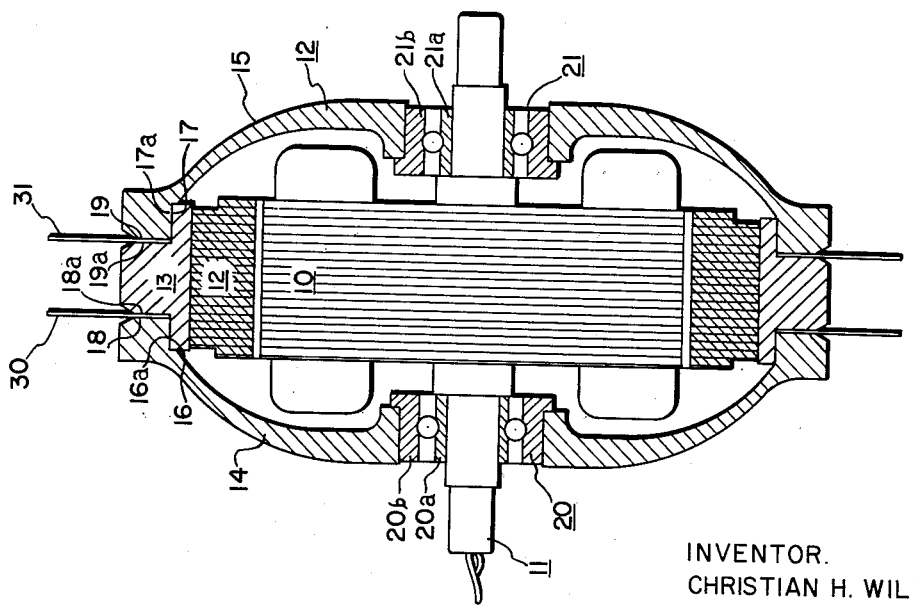
FIG. 1 illustrates the gyroscopic mechanism with shims in place during the manufacture thereof.

The gyroscopic mechanism illustrated comprises a stator 10 having an axle 11 and a rotor 12 having a rim 13 and end bells 14 and 15. The rim 13 and the end bells 14 and 15 have inter-engageable cylindrical surfaces 16, 16a, 17 and 17a, respectively, and have spaced annular flat surfaces 18, 18a, 19 and 19a, respectively, perpendicular thereto. The end bells are bearingly mounted on opposite ends of the stator and on the axle 11 by suitable ball bearings 20 and 21 having the well known inner and outer races 20a, 20b, 21a and 21b, respectively, with the inner races 20a and 21a mounted on the axle 11 and the outer races 20b and 21b mounted on the end bells 14 and 15, respectively. Thus, in the completed assembly, the end bells and rim cooperatively completely inclose the stator.

Figure 3:
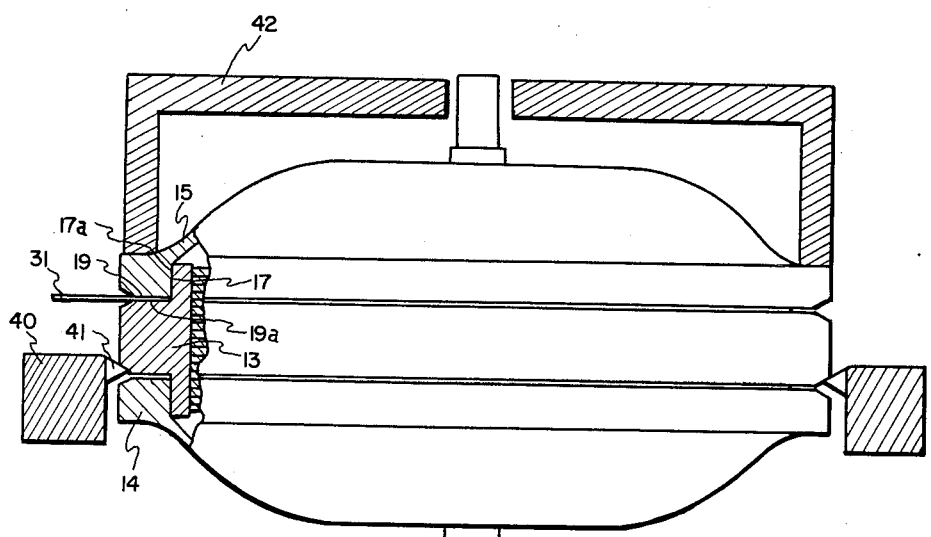
FIG. 3 illustrates the jig used in assembling the gyroscopic mechanism.
Figure 4:
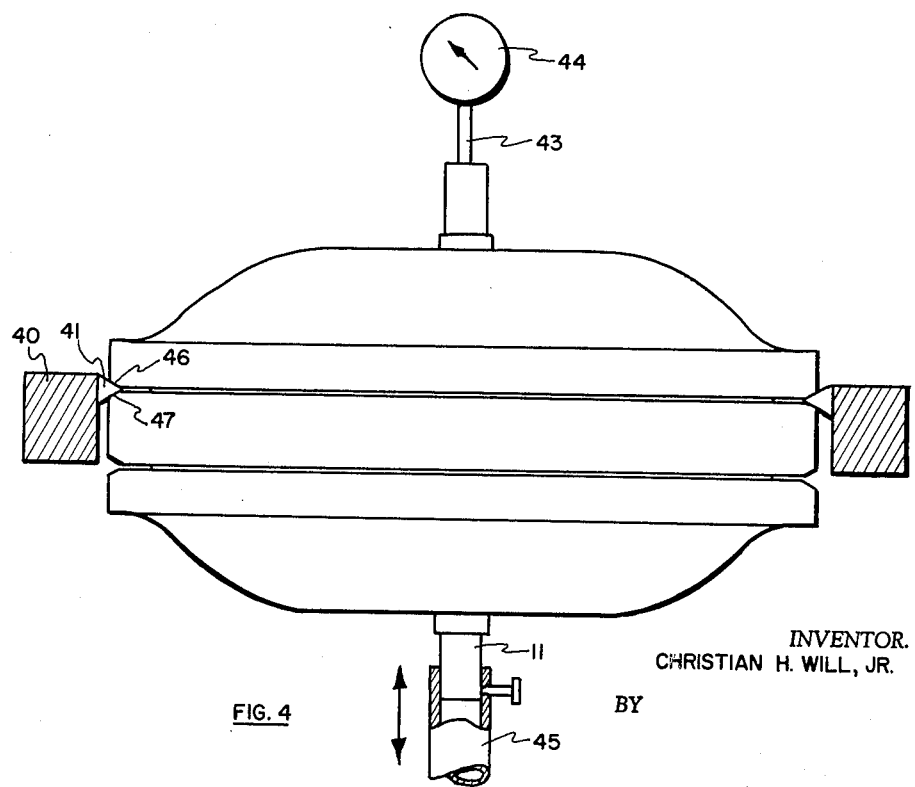
FIG. 4 illustrates the jig and fixtures used for measuring and making the final adjustment of the gyroscopic mechanism.

The process of assembling the device includes the following steps: The inner races 20a and 21a of the ball bearings 20 and 21 are fitted to their respective ends of the axle 11 of the stator 10 and the outer races 20b and 21b of the ball bearings 20 and 21 are fitted to their respective end bells 14 and 15. The rim 13 is placed about the stator 10 and in the vise 40 and held there by a plurality of fingers 41 and as shown in FIG. 3. Glue is applied to at least one of the cylindrical surfaces 17 and 17a. Although any suitable type of material may be used herein, it is preferred that epoxy resin base cement or similar bonding material be used since it has physical characteristics which permit it to bond the surfaces together even after they have high machine polishes to make them very smooth and accurate. End bell 15 is positioned on its respective end of the stator axle 11 with the cylindrical surface 17a thereof in engagement with the cylindrical surface 17 of the rim 13 and with the outer races 21b of the ball bearings 21 in their approximate position relative to the inner race 21a of the ball bearing 21. One or more shims 31, for example .025" in thickness, are placed between surfaces 19 and 19a. The portion 42 of the assembling fixture presses the end bell 15 until surfaces 19 and 19a come in contact with the respective surfaces of shims 31. It is to be noted that the fingers 41 of the clamp 40 touch only the rim 13 even if the end bell 14 were in position. The end bell 14 is assembled on rim 13 in the same manner as end bell 15.

The gyroscopic mechanism is now placed in a measuring and final aligning jig. A gage 44 is positioned in contact with one end of axle 11 such that as the axle is moved endwise relative to the end bells or rotor, the gage indicates the distance the axle moves. Suitable means, for example actuator 45, engages the other end of axle 11 to impart pressure and to urge movement of the axle. The clamp 40 now has its fingers 41 positioned so that they lightly touch the surface 46 of end bell 15 and 47 of rim 13. The axle 11 is then urged endwise and the gage indicates the play in the mechanism. If the gage indicates that shims of a different thickness will have to be used to obtain the desired tolerances, the gyroscopic mechanism is again placed in the assembling jig and new shims are used in place of shims 31. This process may be repeated as many times as necessary to obtain the desired tolerances. It is to be noted that the glue used will not set up for many hours. After removing the shims, the glue is solidified to unite the end bells and rim in an extremely accurate substantially integral rotor completely inclosing the stator. Solidification of the glue may be speeded up, if desired, by baking the entire unit at a drying temperature, i.e., 170° F. for one hour in the case of an epoxy resin.

Although the present invention has been described with a certain degree of particularity, it is understood that various modifications in the details and arrangements of parts may be had without departing from the spirit and scope of the invention as hereinafter claimed.

I claim:

1. The process of assembling a gyro comprising a stator having an axle and a rotor having a rim and first and second end bells, said rim and said bells having inter-engageable surfaces and having spaced shim surfaces perpendicular thereto, said process comprising the steps of placing the rim about the stator, applying glue to at least one of the inter-engageable surfaces of the rim and the first end bell, positioning the first end bell on its respective end of the stator axle with its inter-engagable surface in engagement with the corresponding surface of the rim, inserting first shim means between the shim surface of the rim and the first end bell, pressing the first end bell onto the rim and against the first shim means, applying glue to at least one of the inter-engageable surfaces of the rim and the second end bell, positioning the second end bell on its respective end of the stator axle with its interengageable surface in engagement with the corresponding surface of the rim, inserting second shim means between the shim surface of the rim and the second end bell, pressing the second end bell on the rim and against the second shim means, removing the first and second shim means and finally solidifying the glue to unite the end bells and rim in an extremely accurate substantially integral rotor completely inclosing the stator.

2. The process as defined in claim 1 wherein the step of finally solidifying the glue constitutes baking the entire unit.

3. A gyroscopic assembly comprising a gyroscope stator having an axle and a gyroscope rotor, a rim, and first and second end bells having mounting surfaces, said rims providing supporting surfaces generally corresponding to said mounting surfaces and permitting said first and second end bells to be initially adjustably shifted relative to said rim into oriented positions, and bonding means to retain said first and second end bells in said oriented position to provide a gyroscopic assembly having a housing, which is in effect a single piece construction, thereby unaffected by stresses and strains due to heat or physical movement of said gyroscopic assembly.

References Cited in the file of this patent

UNITED STATES PATENTS

| | | |
|---|---|---|
| 2,423,869 | Blessing | July 15, 1947 |
| 2,566,249 | Rainey | Aug. 28, 1951 |
| 2,649,808 | Slater | Aug. 25, 1953 |
| 2,800,811 | From | July 30, 1957 |
| 2,822,694 | McKenney | Feb. 11, 1958 |

FOREIGN PATENTS

| | | |
|---|---|---|
| 202,819 | Australia | July 27, 1956 |